(12) United States Patent
Carter-Schwendler et al.

(10) Patent No.: US 11,811,899 B2
(45) Date of Patent: *Nov. 7, 2023

(54) IPV4/IPV6 BRIDGE

(71) Applicant: Microsoft Technology Licensing, LLC, Redmond, WA (US)

(72) Inventors: Carl Carter-Schwendler, Seattle, WA (US); Murali Sangubhatla, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/499,317

(22) Filed: Oct. 12, 2021

(65) Prior Publication Data
US 2022/0159104 A1    May 19, 2022

Related U.S. Application Data

(63) Continuation of application No. 16/510,549, filed on Jul. 12, 2019, now Pat. No. 11,146,666, which is a continuation of application No. 15/206,250, filed on Jul. 9, 2016, now Pat. No. 10,382,593, which is a continuation of application No. 12/642,376, filed on Dec. 18, 2009, now Pat. No. 9,392,080.

(51) Int. Cl.
| | |
|---|---|
| *H04L 69/167* | (2022.01) |
| *H04L 61/5007* | (2022.01) |
| *H04L 69/16* | (2022.01) |
| *G06F 9/455* | (2018.01) |

(52) U.S. Cl.
CPC ........ *H04L 69/167* (2013.01); *G06F 9/45558* (2013.01); *H04L 61/5007* (2022.05); *H04L 69/16* (2013.01); *G06F 2009/45595* (2013.01)

(58) Field of Classification Search
None
See application file for complete search history.

(56) References Cited

U.S. PATENT DOCUMENTS 7,865,586 B2 *   1/2011   Cohn .................. H04L 41/0803
709/224

OTHER PUBLICATIONS

Aoun, et al., "Reasons to Move the Network Address Translator—Protocol Translator (NAT-PT) to Historic Status", Retrieved From: datatracker.ietf.org/doc/html/rfc4966, Jul. 2007, 25 Pages.

* cited by examiner

*Primary Examiner* — Eric C Wai
(74) *Attorney, Agent, or Firm* — WORKMAN NYDEGGER (57) ABSTRACT

A virtual machine host may provide IPv4 connections to IPv4 virtual machine guests and map the connections to IPv6 networks. The IPv6 addressed exposed by the virtual machine host may be used in an IPv6 environment to communicate with the virtual machine guests, enabling various IPv6 connected scenarios for the IPv4 virtual machines. The virtual machine host may receive IPv6 communications, and translate those communications to IPv4 to communicate with the virtual machine guests. Similarly, the outbound IPv4 communications may be translated into IPv6 for communications to the IPv6 network.

16 Claims, 5 Drawing Sheets

IPV4/IPV6 BRIDGE

CROSS-REFERENCE TO RELATED APPLICATION(S)

This is a continuation of U.S. patent application Ser. No. 16/510,549, entitled "IPV4/IPV6 BRIDGE", filed on Jul. 12, 2019, which is a continuation of U.S. patent application Ser. No. 15/206,250, entitled "IPV4/IPV6 BRIDGE", filed on Jul. 9, 2016 and issued as U.S. Pat. No. 10,382,593 on Aug. 13, 2019, which is a continuation of U.S. application Ser. No. 12/642,376, entitled "IPV4/IPV6 BRIDGE", filed on Dec. 18, 2009 and issued as U.S. Pat. No. 9,392,080 on Jul. 12, 2016, the entire contents of which are incorporated herein by reference for all purposes.

BACKGROUND

Internet Protocol version 6 (IPv6) is an improved addressing scheme over Internet Protocol version 4 (IPv4). IPv6 uses a 128 bit addressing scheme and may enable much larger connectivity than IPv4 in the Internet.

Many IPv4 systems may not be capable of using IPv6 addressing. Such systems may not be able to take advantage of various connectivity mechanisms that are available in an IPv6 environment. The IPv6 connectivity mechanisms may provide end to end connectivity with encryption and other features that may not be supported in many IPv4 systems.

SUMMARY

A virtual machine host may provide IPv4 connections to IPv4 virtual machine guests and map the connections to IPv6 networks. The IPv6 addressed exposed by the virtual machine host may be used in an IPv6 environment to communicate with the IPv4 virtual machine guests, enabling various IPv6 connected scenarios for the IPv4 virtual machines. The virtual machine host may receive IPv6 communications, and translate those communications to IPv4 to communicate with the virtual machine guests. Similarly, the outbound IPv4 communications may be translated into IPv6 for communications to the IPv6 network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

IPv4 devices may be used with IPv6 protocols by an interface device that may serve as a terminus for IPv6 communications and translate IPv6 communications to IPv4. The interface device may create an IPv4 subnet but may initiate and respond to IPv6 communications on a network. The interface device may translate or convert communications between IPv4 and IPv6 to facilitate the communications.

The interface device may be incorporated into a virtual host, which may be a physical computing device that may operate one or more virtual devices. The virtual devices may communicate using IPv4, while the host may communicate using IPv6 to a physical network connection.

The interface device may provide IPv6 connectivity for IPv4 devices that may enable IPv6 connected scenarios. In one such connected scenario, a remote device may use IPv6 addressing to reach intranet resources, which may be computer devices inside a corporate firewall. The intranet resource may be an IPv4 virtual machine, but may be operated on a virtual machine host that exposes IPv6 addresses. The IPv6 address of the IPv4 virtual machine may be used to identify the IPv4 virtual machine, establish a connection, and access the IPv4 virtual machine.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
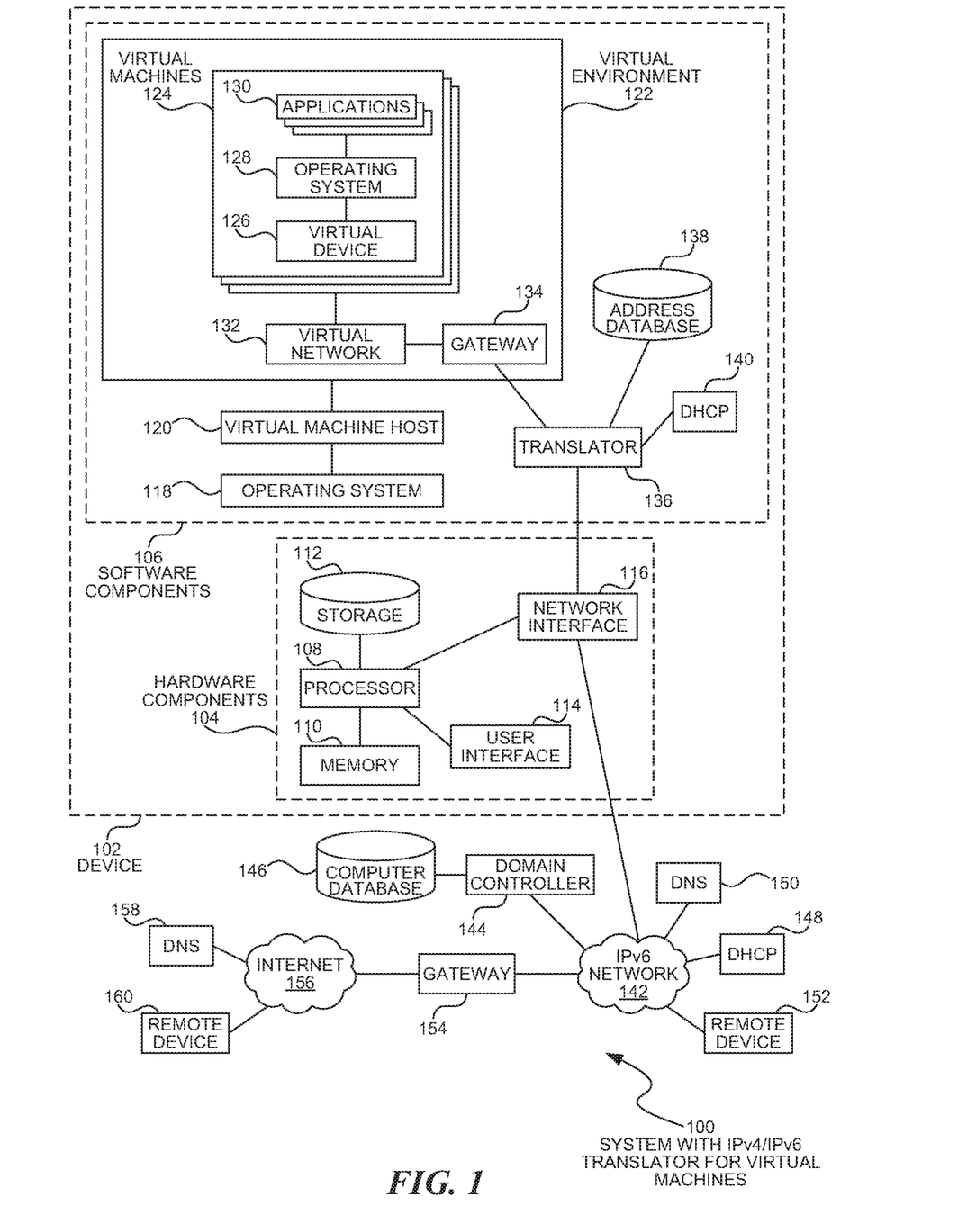
FIG. 1 is a diagram illustration of an embodiment showing a network environment in which a virtual machine host may operate.

FIG. 1 is a diagram of an embodiment 100, showing a virtual machine with IPv4 addressing operating in an IPv6 environment. Embodiment 100 is a simplified example of a network environment where an IPv4 virtual machine may interact with, respond to, and operate with other devices that may be IPv6 compliant.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is a simplified example of an environment where a virtual device may operate. The environment may be an IPv6 network environment, but a legacy device may still be made available through a translator in a virtual machine host device. The translator may present the IPv4 device with an IPv6 address to the network, and may translate the IPv6 communications to IPv4 so that the virtual device may understand and consume the communications.

The translator may enable many connected scenarios. IPv6 is typically deployed with IPsec protocols, which may provide authentication and encryption for communications. Because the virtual machine host has an IPv6 presentation to the network, the IPsec protocols may be used from the IPv6 devices to the virtual machine host, ensuring an encrypted and authenticated communication even though the virtual machine is an IPv4 device.

The device 102 acting as a virtual machine host may have hardware components 104 and software components 106. Device 102 may reflect any type of computing device, such as a server computer, desktop computer, or other similar device. In some embodiments, the device 102 may be a portable device, such as a netbook computer, laptop computer, personal digital assistant, cellular telephone, or other device.

In one use scenario, the device 102 may be a server computer used to host virtual machines that execute legacy applications. A legacy application may operate on an older operating system that may not support IPv6, but the legacy application may have some continued business use. In the use scenario, a company's network infrastructure may be upgraded from IPv4 to IPv6, and the devices that have older operating systems may be virtualized and executed in a virtual environment. As virtual devices, the legacy applications may be present in the network, but the network may function with IPv6 addressing and the associated protocols.

In another use scenario, IPv6 enables authenticated connections from devices outside of a local area network. For example, a user may have a laptop or other portable computing device at an airport, customer location, coffee shop, or other location. Because IPv6 enables unique addressing to all devices and IPsec and other protocols enable authentication and encryption, a user on a portable computer may be able to address an IPv6 device directly, authenticate against the device, and establish a communication session. Such a scenario can be implemented with embodiment 100 even though the virtual device may not support IPv4.

The hardware components 104 may include a processor 108, random access memory 110, and nonvolatile storage 112. Many devices may have multiple processors. In many cases, the nonvolatile storage 112 may be a device such as a disk drive or other storage mechanism, although some devices may have solid state nonvolatile memory devices.

The hardware components 104 may include a network interface 116. The network interface 116 may be the physical connection between the device 102 and a network, such as the IPv6 network 142. In some embodiments, the network interface 116 may be a hardwired connection, such as an Ethernet connection. Other embodiments may have a wireless connection, such as a wireless connection conforming to IEEE 802.11, IEEE 802.16, or other wireless connection protocol.

In many embodiments, the network interface 116 may have several hardware components that perform certain functions in compliance with an interface standard. For example, Application Specific Integrated Circuits (ASIC) technology is often used to perform handshaking, protocol implementation, encryption, and other portions of a network interface. Other embodiments may perform some or all of these functions in software.

A user interface 114 may be any type of user interface. In many embodiments, the user interface 114 may be a display device and an input device, such as a monitor and keyboard/mouse typical of a computer system. In some embodiments, a remote connection may be used to connect to the device 102 and interact with the device. In such embodiments, the device 102 may not have a physical user interface.

The software components 106 may include an operating system 118 and a virtual machine host 120. The virtual machine host 120 may create a virtual environment 122 in which virtual machines 124 may operate. The virtual machine host 120 may enable many two or more virtual machines 124 to operate on a single hardware platform.

The virtual machines 124 may include a virtual device 126, an operating system 128, and various applications 130 that may execute on the operating system 128. The virtual device 126 may be a software representation of a hardware platform. Each virtual device may be independently configured to have different capabilities than other virtual devices. For example, one virtual device may be configured with 4 GB of random access memory, while another virtual device may be configured with 8 GB or random access memory. The virtual devices may be configured differently to support different operating systems or to provide resources for applications that may operate on the virtual devices.

The virtual devices 124 may be connected using a virtual network 132. The virtual network 132 may be a software construct that passes network communications between the various virtual machines as well as to a gateway 134 that may connect to an external network.

The virtual network 132 may support IPv4 so that those virtual machines 124 that do not support IPv6 may communicate within the virtual network 132 and outside the virtual network 132 to the IPv6 network 142. In some embodiments, the virtual network 132 may support both IPv4 and IPv6. Some such implementations may be known as 'dual stack' networks.

The connection between the gateway 134 and the physical network interface 116 is bridged by a translator 136. The translator 136 may present an IPv6 interface to the physical network such as the IPv6 network 142, but may translate communications to the IPv4 virtual devices 124.

An address database 138 may store the IPv4 addresses of the virtual devices 124 and their corresponding IPv6 addresses as presented to the IPv6 network 142. When a communication is received on the IPv6 network, the communication may be addressed using an IPv6 address. The translator 136 may look up the IPv6 address to determine an IPv4 address for the corresponding virtual machine 124, then format the message to comply with IPv4, and transmit the message to the virtual machine over the virtual network 132.

Some embodiments may include DHCP services 140 as part of the virtual network 132. Dynamic Host Configuration Protocol (DHCP) is a mechanism by which Internet Protocol (IP) addresses may be assigned to various devices. In general, a device may connect to a network and send a request for an address and connection information. A DHCP service may respond with an IP address and, in some cases, additional information such as gateway, subnet mask, Domain Name Services (DNS) server addresses, and other information. The response may be used by the requesting device to configure a network connection and begin communications on the network.

The DHCP services 140 may be used to assign IP addresses and other configuration information to the virtual devices 124. In some embodiments, the DHCP service 140 may use dynamic allocation, where an address assignment may be temporal and may expire if not renewed by the requesting device. Some embodiments may use DHCP with automatic allocation, which may operate by keeping a record of previous address assignments and may re-assign the same address to a device when the device re-connects to the network. Some embodiments may use static allocation in DHCP, which uses a predefined IP address for a corresponding Media Access Control address provided in the DHCP request.

The translator 136 may provide an IPv6 presence for a virtual machine to the IPv6 network 142. The IPv6 presence may include having an IPv6 address on the IPv6 network 142, as well as providing the hostname and other information for the virtual machine 124.

The translator 136 may perform a DHCP request over the IPv6 network 142 to reach a DHCP server 148. The DHCP server 148 may return an IPv6 address that the translator 136 may use to represent a virtual machine 124.

In some embodiments, a virtual machine 124 may be a member of a domain. In such embodiments, a domain controller 144 may manage the virtual machine 124 and may maintain a record for the virtual device 124 in the computer database 146. The domain controller 144 may provide a large host of services, which may include authentication, permission settings, and other services. In many cases, a domain controller 144 may disperse configuration settings in the form of group policies that may be applied by each computer.

When a virtual machine 124 is given an IPv6 presence on the IPv6 network 142, the translator 136 may register the virtual machine 124 with the domain controller 144 as well as a Domain Name Service (DNS) server 150. The registration may merely indicate the status of the virtual machine 124, as well as the IPv6 address and name of the virtual machine 124.

The DNS server 150 may resolve host names into IP addresses. A device may request an IP address by sending a name for a device to the DNS server 150. The DNS server 150 may look up the requested name to determine an IP address and respond with the IP address.

The DNS server 150 may provide DNS services for remote devices 152 that are within a local area network, such as the IPv6 network 142. The DNS server 150 may also provide DNS services for devices 160 connected through the gateway 154 that may reside on the Internet 156. In some such cases, the local DNS server 148 may communicate with the remote DNS service 158 to gather information about remote devices 160.

Figure 2:
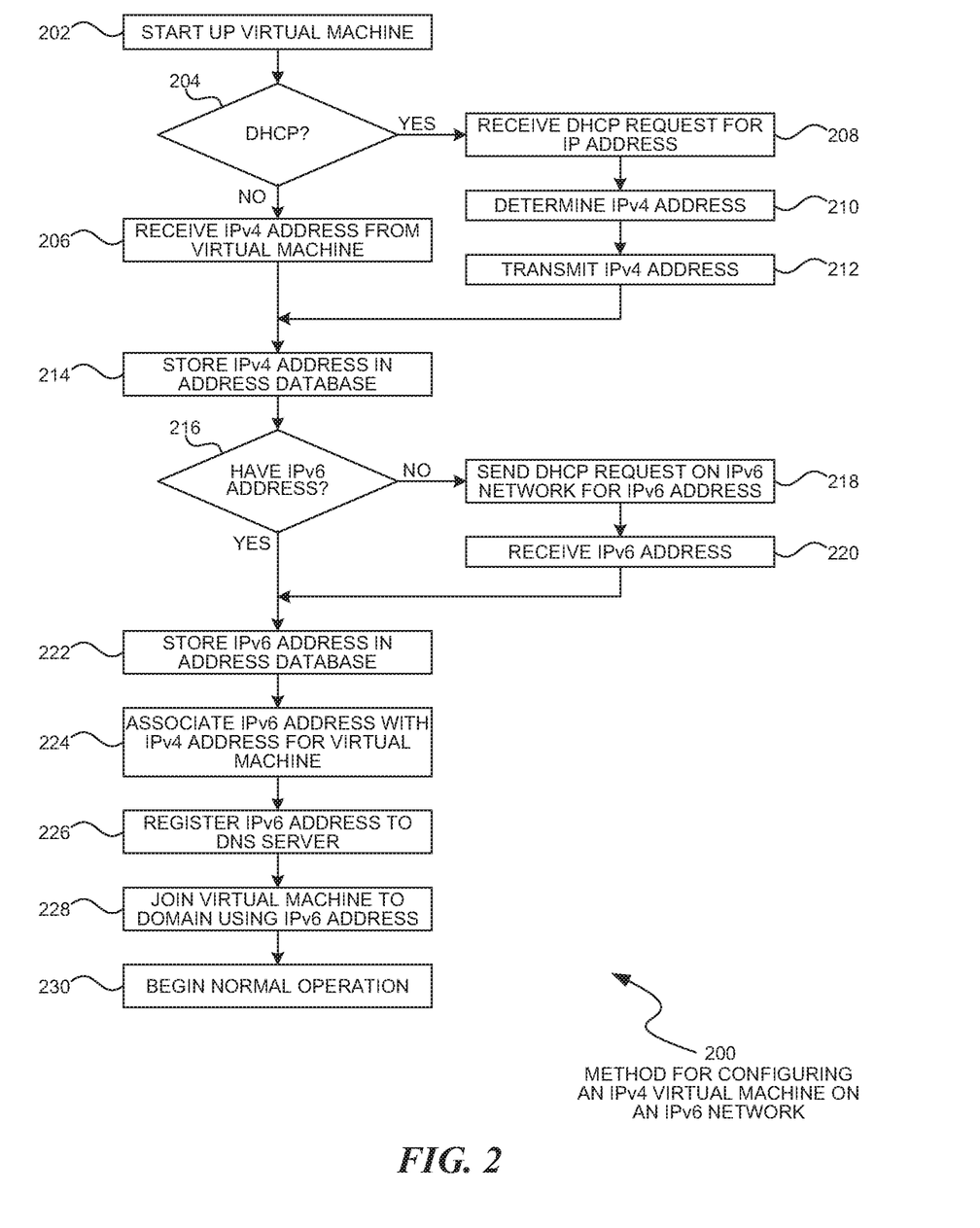
FIG. 2 is a flowchart illustration of an embodiment showing a method for configuring an IPv4 virtual machine on an IPv6 network.

FIG. 2 is a flowchart illustration of an embodiment 200 showing a method for configuring an IPv4 virtual machine in an IPv6 network. The operations of embodiment 200 may be performed by a virtual machine host, such as the virtual machine host 102 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a process for configuring a virtual machine to operate on an IPv6 network, where the virtual machine may only communicate using IPv4.

The virtual machine may be started in block 202. When a virtual machine starts operations, the virtual machine may attempt to connect to a virtual network. If the virtual machine does not use DHCP to determine an IPv4 address for the virtual network in block 204, the virtual machine host may receive the IPv4 address from the virtual machine in block 206.

If the virtual machine uses DHCP in block 204, the virtual machine host may receive a DHCP request for an IP address in block 208, determine an IPv4 address in block 210, and transmit the address in block 212.

The operations of blocks 208, 210, and 212 may be performed by a DHCP service such as DHCP service 140, which may operate within the device 102. In other embodiments, IPv4 address may be determined by querying an external device, such as a domain server or another physical device that may perform DHCP services.

The IPv4 address assigned to a virtual device may be stored in block 214. A database such as a look up table or other database may be used to store information about the virtual devices. The database may be used by a translator for routing messages from an IPv4 network inside a virtual machine host to an external IPv6 network.

If an IPv6 address is not defined for the virtual machine in block 216, a DHCP request may be sent over an IPv6 network to a DHCP server in block 218, and an IPv6 address may be received in block 220.

The IPv6 address for the virtual machine may be stored in the address database in block 222, and the IPv6 address may be associated with the IPv4 address in block 224.

The IPv6 address may be used to register the virtual machine with a DNS service in block 226. The registration may be performed explicitly by sending a message to a DNS server in block 226. In some embodiments, the DNS registration may be performed implicitly or by another service. For example, the DHCP request of block 218 may cause a DHCP service to send information to a DNS server.

In some embodiments, the IPv6 address may be used to join a domain in block 228. The virtual device may have a presence within an IPv6 network that may allow a domain controller to manage the virtual machine.

Figure 4:
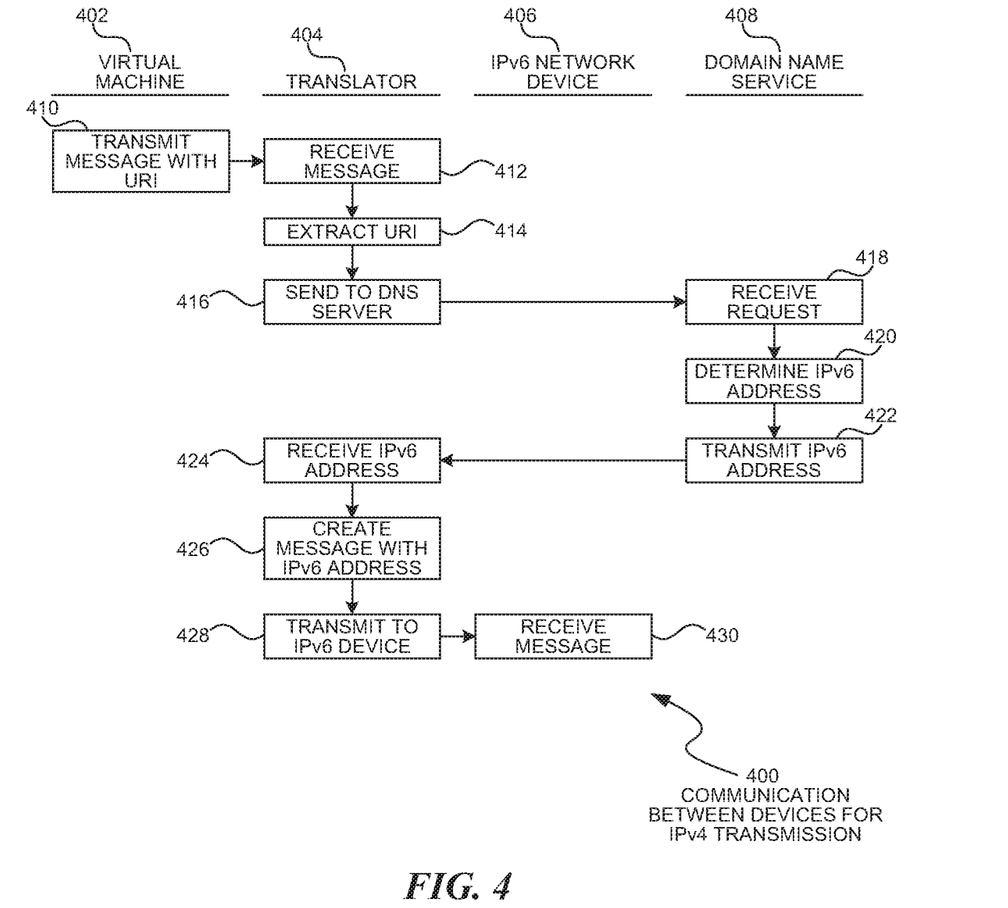
FIG. 4 is a timeline illustration of an embodiment showing a method for transmitting a message from an IPv4 virtual machine.
Figure 5:
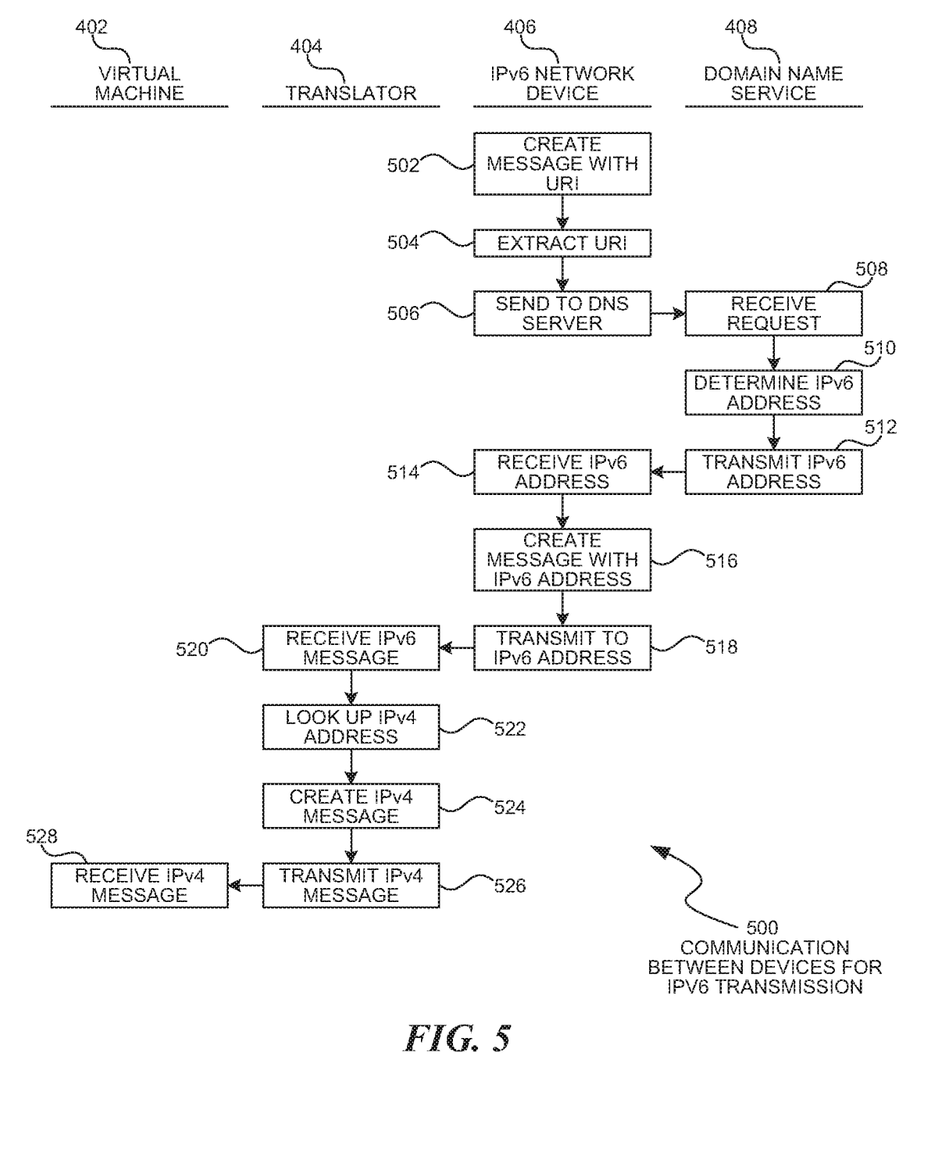
FIG. 5 is a timeline illustration of an embodiment showing a method for transmitting a message from an IPv6 device to an IPv4 virtual machine.

The virtual machine may be operated in block 230. Embodiments 400 and 500 presented later in this specification illustrate some of the ways the virtual machine may interact with other devices using IPv6.

Figure 3:
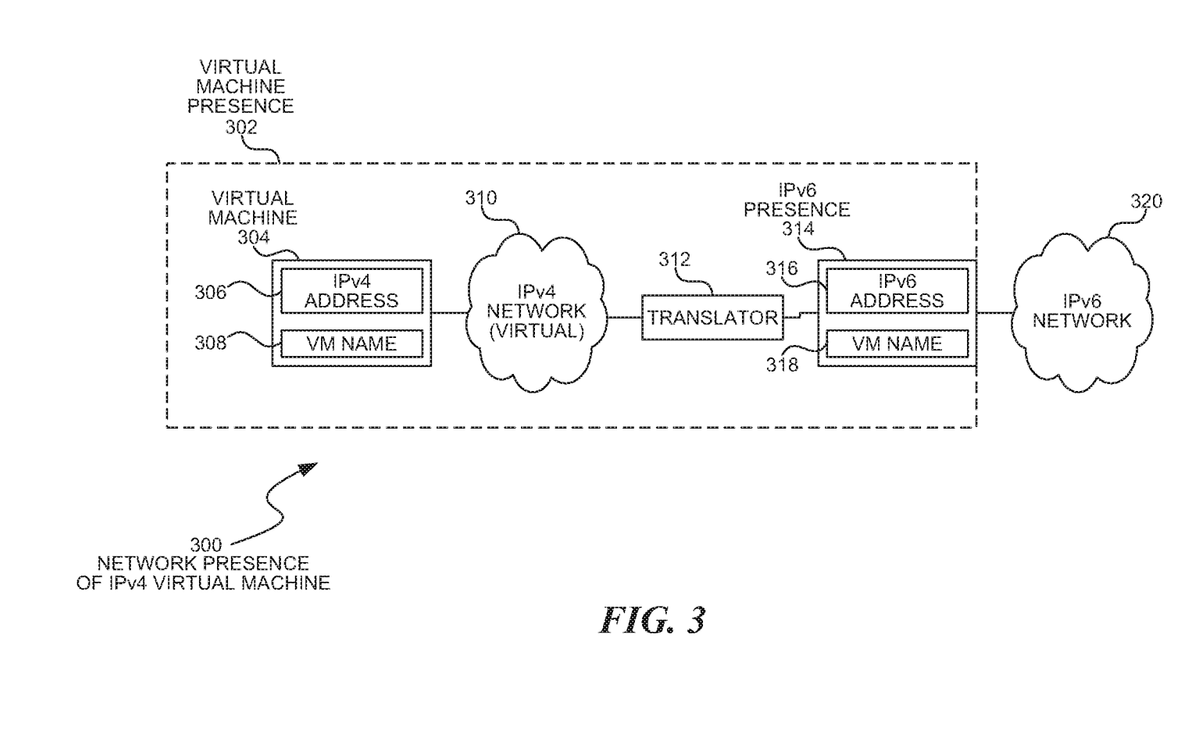
FIG. 3 is a diagram illustration of an embodiment showing a network presence of an IPv4 virtual machine.

FIG. 3 is a diagram of an embodiment 300, showing a network presence of a virtual machine. The virtual machine may be an IPv4 device that has a network presence of an IPv6 device.

The diagram of FIG. 3 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 300 illustrates some of the components of embodiment 100 in a manner that shows how an IPv4 virtual machine may configured as an IPv6 device. The virtual machine presence 302 may include the virtual machine 304, where the virtual machine 304 may have an IPv4 address 306 and a virtual machine name 308. Within a virtual environment, the virtual machine 304 may communicate over an IPv4 virtual network 310 to a translator 312.

The translator 312 may provide an IPv6 presence 314 that may have an IPv6 address as well as a virtual machine name 318. The virtual machine presence 302 may make the virtual machine 304 appear like another IPv6 device, and may respond to IPv6 communications, use IPsec and other IPv6 protocols, and otherwise appear like an IPv6 device. However, the actual virtual machine 304 may be an IPv4 device that may have limited or no support for IPv6 and the related protocols. The translator 312 may provide the IPv6-specific functions.

FIG. 4 is a timeline illustration of an embodiment 400 showing communications between devices for an IPv4 transmission. Embodiment 400 is a simplified example of a transmission that may originate with a virtual machine on an IPv4 network, such as the virtual machine 124 on the virtual network 132. The transmission may be intended for a remote device, such as the remote devices 152 or 160 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operations of a virtual machine 402 are illustrated on the left hand column. Similarly, the respective operations of a translator 404, IPv6 network device 406, and DNS server 408 are illustrated in the next three columns.

Embodiment 400 is an example of the communications that may occur when a message originates with an IPv4 virtual machine 402 and are transmitted to an IPv6 network device 406. Embodiment 400 illustrates the simplified operations of a DNS server 408 as well.

A message may be created by the virtual machine 402 in block 410. The message may be addressed using a Uniform Resource Identifier. The translator 404 may receive the message in block 412, extract the URI in block 414, and send the URI to the DNS server 408 in block 416.

The DNS server 408 may receive the request in block 418, determine an IPv6 address in block 420, and transmit the IPv6 address in block 422.

The translator 404 may receive the IPv6 address in block 424 and create a message in block 426 that uses the IPv6 address received from the DNS server 408. The message may be transmitted in block 428 and in block 430, the IPv6 device 406 may receive the message.

The operations of embodiment 400 are highly simplified to illustrate the communication between the IPv4 virtual machine 402 and the IPv6 network device 406. Embodiment 400 illustrates that IPv4 communications may be made between the IPv4 virtual machine 402 and the translator 404, and that IPv6 communications may occur from the translator 404 to the other devices, including the DNS server 408 and the IPv6 network device 406.

FIG. 5 is a timeline illustration of an embodiment 500 showing communications between devices for an IPv6 transmission. Embodiment 500 is a simplified example of a transmission that may originate with an IPv6 network device intended for an IPv4 virtual machine. Embodiment 500 illustrates the same devices as embodiment 500, but where a message may originate with the IPv6 device that attempts to communicate with an IPv4 virtual machine.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operations of a virtual machine 402 are illustrated on the left hand column. Similarly, the respective operations of a translator 404, IPv6 network device 406, and DNS server 408 are illustrated in the next three columns.

Embodiment 500 is an example of the communications that may occur when a message originates with an IPv6 network device 406 and is transmitted to an IPv4 virtual machine 402.

In the example of embodiment 500, the IPv4 device has an IPv6 presence as illustrated in embodiment 300. The IPv6 presence may include an machine name and IPv6 address, both of which may be stored in a DNS server.

The IPv6 network device 406 may create a message using a URI designator for the IPv4 virtual machine 402. The URI may be extracted in block 504 and transmitted to the DNS server 408 in block 506.

The DNS server 408 may receive the request in block 508, determine an IPv6 address in block 510, and transmit the IPv6 address in block 512.

The IPv6 address determined in block 510 may be the IPv6 address associated with the translator 404 for the IPv4 virtual machine 402.

The IPv6 network device 406 may receive the IPv6 address in block 514, create a message using the IPv6 address in block 516, and transmit the message in block 518.

The translator 404 may receive the IPv6 message in block 520, look up the corresponding IPv4 address in block 522 and may create an IPv4 message in block 524. The IPv4 message may be transmitted in block 526 along a virtual network to the IPv4 virtual machine 402 that may receive the message in block 528.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computing device, comprising:
   a network interface configured to interface the computing device to an IPv6 network; and
   a memory and a processor, wherein the memory and the processor are respectively configured to store and execute instructions for causing the computing device to:
      configure a first virtual machine with a first IPv4 address obtained from a Dynamic Host Configuration Protocol (DHCP) service over a virtual network of the computing device;
      associate the first IPv4 address to a first IPv6 address;
      receive a first IPv6 communication via the network interface, wherein the first IPv6 communication is addressed to the first IPv6 address;
      determine that the first IPv6 address corresponds with the first IPv4 address;
      determine that the first IPv4 address is associated with the first virtual machine;
      send a request for the first IPv6 address to an external device, wherein the external device comprises a Domain Name Server (DNS) server;
      receive the first IPv6 address from the external device;
      translate the first IPv6 communication into a first IPv4 communication; and
      transmit the translated first IPv4 communication to the first virtual machine over a first virtual network.

2. The computing device of claim 1, the memory and the processor respectively configured to store and execute instructions for causing the computing device to:
   determine a name for the first virtual machine; and
   transmit the name to the external device as part of the request.

3. The computing device of claim 1, wherein the first virtual machine is configured to execute a legacy application that communicates via IPv4.

4. The computing device of claim 1, wherein the IPv6 network is an Ethernet network, and wherein the network interface is an Ethernet interface.

5. A method, comprising:
   configuring a first virtual machine with a first IPv4 address obtained from a Dynamic Host Configuration Protocol (DHCP) service over a virtual network of a computing device, wherein the first virtual machine is configured to execute a legacy application that communicates via IPv4, and wherein the legacy application does not support IPv6;
   associating the first IPv4 address to a first IPv6 address;
   receiving a first IPv6 communication via a network interface configured to interface the computing device to an IPv6 network, wherein the first IPv6 communication is addressed to the first IPv6 address;
   determining that the first IPv6 address corresponds with the first IPv4 address; translate the first IPv6 communication into a first IPv4 communication; and
   transmitting the translated first IPv4 communication to the first virtual machine over a first virtual network.

6. The method of claim 5, further comprising:
   determining that the first IPv4 address is associated with the first virtual machine;
   sending a request for the first IPv6 address to an external device; and
   receiving the first IPv6 address from the external device.

7. The method of claim 6, wherein the external device is one of a DHCP server or a Domain Name Server (DNS) server.

8. The method of claim 6, further comprising:
   determining a name for the first virtual machine; and
   transmitting the name to the external device as part of the request.

9. The method of claim 5, wherein the IPv6 network is an Ethernet network, and wherein the network interface is an Ethernet interface.

10. A computing device, comprising:
    a network interface configured to interface the computing device to an IPv6 network; and
    a memory and a processor, wherein the memory and the processor are respectively configured to store and execute instructions for causing the computing device to:
       configure a first virtual machine with a first IPv4 address by:
          determining whether the first virtual machine uses Dynamic Host Configuration Protocol (DHCP);
          in response to determining that the virtual machine does not use DHCP, receiving the first IPv4 address from the first virtual machine; and
          in response to determining that the first virtual machine uses DHCP, (i) receiving a DHCP request for an IPv4 address, (ii) determining the first IPv4 address based on the DHCP request, and (iii) transmitting the first IPv4 address;
       associate the first IPv4 address to a first IPv6 address;
       receive a first IPv6 communication via the network interface, wherein the first Ipv6 communication is addressed to the first IPv6 address;
       determine that the first Ipv6 address corresponds with the first IPv4 address;

translate the first Ipv6 communication into a first IPv4 communication; and transmit the translated first IPv4 communication to the first virtual machine over a first virtual network.

11. The computing device of claim 10, the memory and the processor respectively configured to store and execute instructions for causing the computing device to:

determine that the first IPv4 address is associated with the first virtual machine;

send a request for the first IPv6 address to an external device; and receive the first IPv6 address from the external device.

12. The computing device of claim 11, wherein the external device is one of a DHCP server or a Domain Name Server (DNS) server.

13. The computing device of claim 11, the memory and the processor are respectively configured to store and execute instructions for causing the computing device to:

determine a name for the first virtual machine; and transmit the name to the external device as part of the request.

14. The computing device of claim 10, wherein the first virtual machine is configured to execute a legacy application that communicates via IPv4.

15. The computing device of claim 10, wherein the IPv6 network is an Ethernet network, and wherein the network interface is an Ethernet interface.

16. The computing device of claim 10, wherein associating the first IPv4 address to the first IPv6 address comprises:

determining whether an IPv6 address is defined for the first virtual machine;

in response to determining that an IPv6 address is defined for the first virtual machine, storing the IPv6 address as the first IPv6 address in association with the first IPv4 address in an address database; and in response to determining that an IPv6 address is not defined for the first virtual machine, (i) sending a DHCP request for an IPv6 address, (ii) receiving the first IPv6 address, and (iii) storing the first IPv6 address in association with the first IPv4 address in the address database.

* * * * *